United States Patent [19]
Piret

[11] 3,728,910
[45] Apr. 24, 1973

[54] CONTROL DEVICES OF EPICYCLIC GEAR TRANSMISSIONS

[75] Inventor: Jean Piret, Billancourt, France

[73] Assignees: Regie Nationale des Usines Renault, Billancourt; Automobiles Peugeot, Paris, both of France

[22] Filed: Mar. 31, 1971

[21] Appl. No.: 129,713

[30] Foreign Application Priority Data

Ap. 3, 1970 France..................................7012137

[52] U.S. Cl.........................................74/695, 74/473
[51] Int. Cl...................F16h 37/08, G05g 7/16
[58] Field of Search........................74/695; 180/54 R

[56] References Cited

UNITED STATES PATENTS

| | | | |
|---|---|---|---|
| 1,872,541 | 8/1932 | White.....................................74/695 |
| 1,944,789 | 1/1934 | Gravely...............................74/695 X |
| 3,474,690 | 10/1969 | Lepelletier..........................74/695 X |
| 3,491,621 | 1/1970 | Moax....................................74/695 X |

Primary Examiner—Arthur T. McKeon
Attorney—Stevens, Davis, Miller & Mosher

[57] ABSTRACT

This control system is intended for an epicyclic gear train change-speed transmission mechanism comprising at least one main casing and in said casing hydraulic piston-controlled coupling means co-acting with clamping members provided with radial extensions receiving the antagonistic stress from resilient means. This mechanism has said clamping members disposed at unequal intervals along their periphery and received in notches formed in the main casing of the change-speed transmission mechanism, whereby the resultant of the efforts exerted by said resilient means is applied in the direction of the axis of rotation of the planet gear elements and of the coupling means thereof, at right angles to the axis of the shaft controlling the hydraulic gear-shift means lying at the lower portion of the main casing of the change-speed transmission mechanism. This control system and transmission mechanism are applicable to advantage mainly to motor vehicles transmissions, and more particularly to transverse-mounted power and transmission units.

7 Claims, 7 Drawing Figures

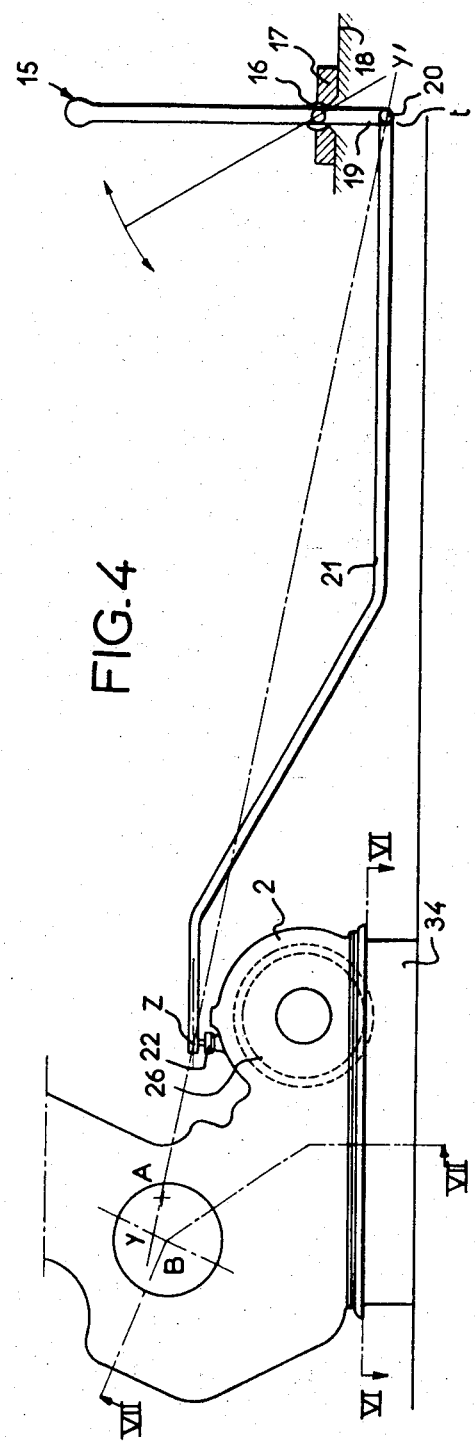
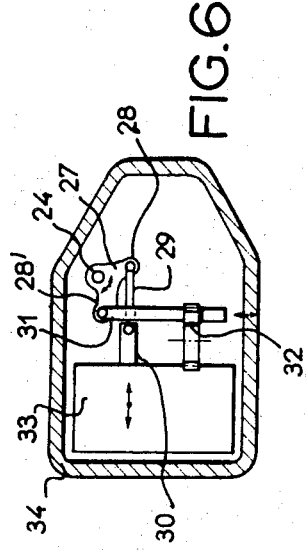
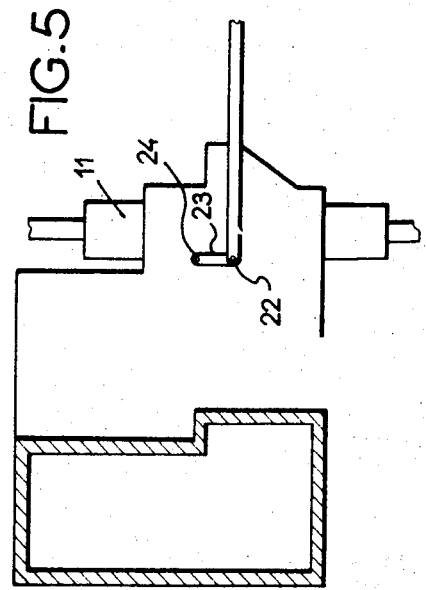

CONTROL DEVICES OF EPICYCLIC GEAR TRANSMISSIONS

The present invention relates to control devices permitting of selecting a given ratio between the engine speed and the wheel speed of an automotive vehicle.

This invention relates more particularly to a mechanism for controlling a change-speed transmission or gearbox of the epicyclic gear train type in the case of a power unit mounted transversely to the longitudinal center line of the vehicle.

The layout of a transverse-mounted power unit associated with an epicyclic gearbox is attended by a number of problems mainly because the epicyclic transmission mechanism has a greater vertical dimension than an equivalent conventional parallel-shaft or synchromesh transmission designed for transmitting the same torque.

Under these conditions, there is demand for a gearbox disposal in a particular space, as seen from one end and in plan view, this space being limited by:

the envelope of the members associated with the crank-shaft, the position of the differential axis, the diameter of the joints through which the torque is transmitted to the wheels of the vehicle, and the ground clearance.

the position of the axis of the differential and of the starter-driven toothed ring mounted on the periphery of the torque converter, and sometimes the position of the longitudinal chassis members.

It is known that the construction of gearboxes of reduced over-all dimensions according to the above-summarized requirements constitutes a particularly difficult problem, unless a special arrangement is provided for the mechanisms controlling the multiple-plate brakes provided for holding or locking against rotation one or a plurality of gear units of the epicyclic train by temporarily locking them in relation to the fixed casing of the mechanism.

Hitherto known braking disks of this kind comprise to this end clamping plates provided with equally spaced radial extensions for locking these flanges against rotation. These extensions constitute the bearing surfaces of springs counteracting the thrust of the hydraulic pistons of the brake actuators. The function of these springs is to return the aforesaid pistons to their initial position when the bottom of the relevant cylinder communicates with the oil sump.

However, it is observed that this construction is inadequate in the case of transverse-mounted engines for it increases the gearbox diameter, due notably to the existing dimensions of the transmission joints and to the necessary ground clearance. To avoid this inconvenience, a known proposition consisted in using return springs reacting against the piston faces. However, this solution is objectionable in that it increases unduly the length of the transmission mechanism.

It is also known that a power unit comprises a number of mechanisms enclosed in casings of which the assembly must meet certain requirements from the dual point of view of comfort and easy assembling.

On the other hand, it is difficult to obtain a satisfactory layout for the manual gear change control system when it is desired to isolate this system from the relative movements or oscillations occurring between the power unit and the vehicle body.

Fluid-tightness requirements linked to the multiplicity of joint or assembling planes between the various casings make it necessary to use a more or less complicated control system for the hydraulic or hydro-electric servo units of the clutch and brakes through the various casings of the unit.

It is the essential object of the present invention to avoid the inconveniences set forth hereinabove by providing an improved disposal of the mechanism for controlling the brakes permitting the temporary locking of the epicyclic gear train.

This invention is also concerned with a manual gearbox control mechanism comprising a vertical control member disposed in the upper portion of the main gearbox casing.

It is a further object of this invention to provide a control mechanism of the type broadly set forth hereinabove without detrimentally affecting the fluid-tightness of the various casings.

In addition, this invention is concerned with the provision of a simplified control mechanism insensitive to relative movements occurring between the power unit and the vehicle body.

The transmission mechanism of the epicyclic gear train type, which comprises a casing consisting of a main gearbox casing, of a torque-converter casing and of a differential gear casing, coupling devices of the hydraulic control type responsive to a piston co-acting with members provided with radial clamping extensions receiving the antagonistic thrusts of resilient members, this complete assembly being housed within said main casing, a hydraulic control unit responsive to a manual control mechanism, is characterized in that said radial extensions of the clamping members, which are distributed unequally along the periphery of said members, are received in notches formed in the main gearbox casing, and that the effort resulting from the antagonistic thrusts of said resilient members is applied along the axes of rotation both of the epicyclic train elements and of the coupling devices, and is perpendicular to the control shaft of the hydraulic unit responsive to said manual control mechanism.

The mechanism thus constructed may be mounted at one end of the gearbox casing, in close vicinity of the hydraulic control unit, and permits the passage of a vertical control shaft of said unit without altering the over-all dimensions contemplated for the gearbox or the position of the axis of the planet gears of the differential which remain aligned with respect to the axis of the vehicle.

Other objects and advantages of this invention will appear as the following description proceeds with reference to the accompanying drawings, illustrating diagrammatically by way of example a preferred form of embodiment of the invention to which many modifications and variations may be brought without departing from the spirit and scope of the invention.

In the drawings:

FIG. 4 is an elevational view of the manual control device;

FIG. 5 is a plan view from above of the manual control device;

FIG. 6 is a section taken along the line VI—VI of FIG. 4; and

Figure 1:
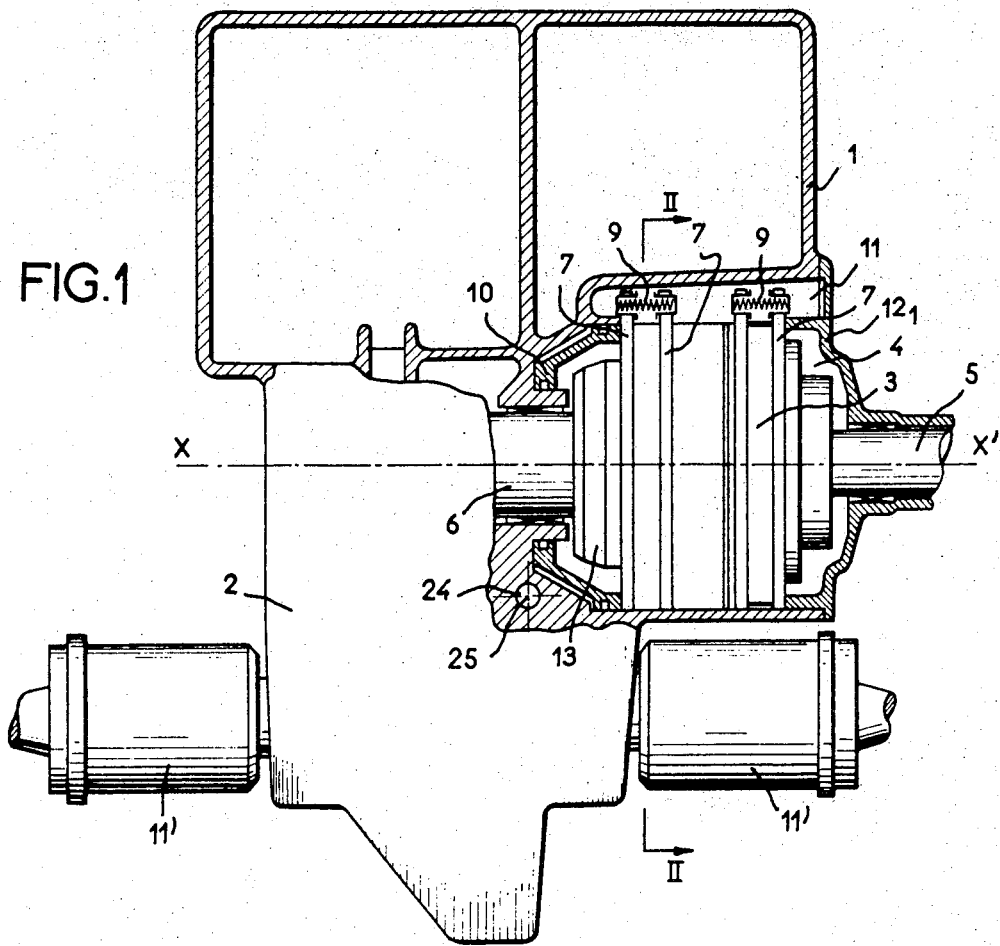
FIG. 1 is a diagrammatic part-sectional view from above of the power unit.
Figure 2:
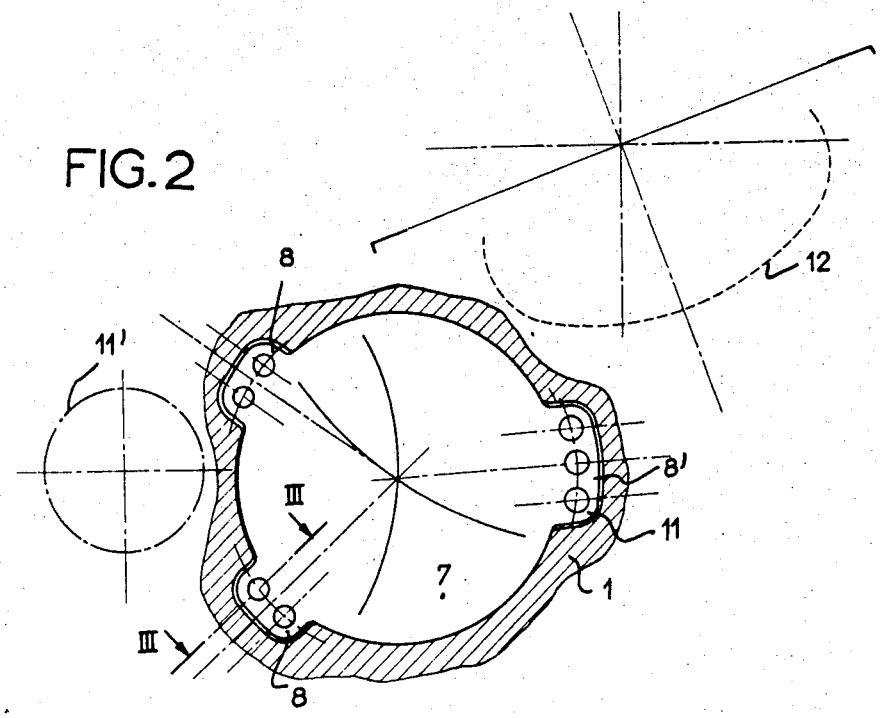
FIG. 2 is a section taken along the line II—II of FIG. 1.
Figure 3:
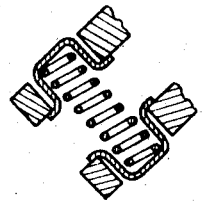
FIG. 3 is a section taken along the line III—III of FIG. 2.
Figure 7:
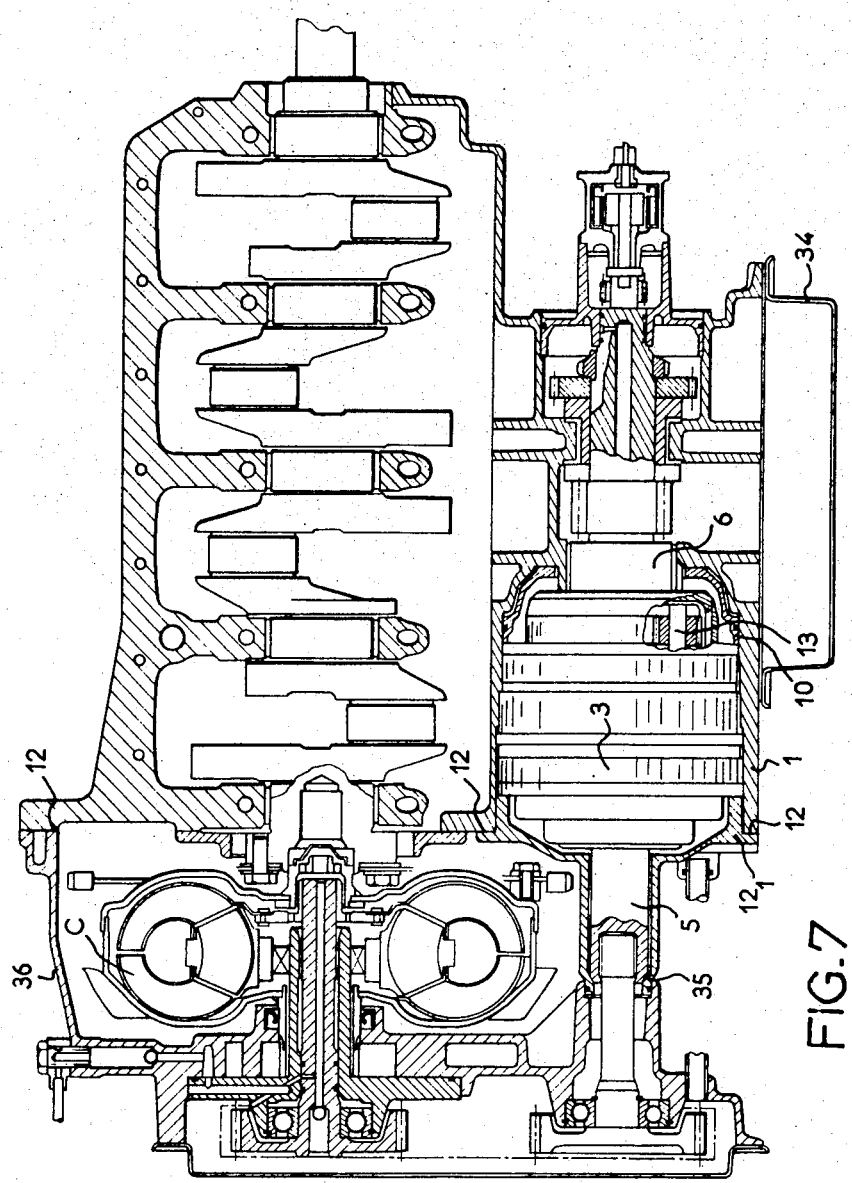
FIG. 7 is an elevational view of a longitudinal section of the assembly, as taken along the line VII—VII of FIG. 4.

The power unit illustrated diagrammatically in FIGS. 1 and 7 comprises a main casing 1 for the change-speed transmission mechanism or gearbox, and a differential casing 2. The mechanism for controlling the epicyclic gear train transmission 3 is enclosed in a chamber 4 of casing 1 of which the input and output shafts are designated by the reference numerals 5 and 6, respectively.

The epicyclic gear train control mechanism comprises clamping members 7 provided with radial extensions 8, 8' distributed unequally along the periphery of the clamping members. Resilient members or springs 9 counteract the movement of these clamping members towards each other when a hydraulic thrust is exerted by the piston 10.

According to this invention said extensions 8, 8' are received in notches or cavities 11 cast integrally with the casing and extending longitudinally in relation to the axis of the gearbox from the front end 12 to the plane gear unit shown diagrammatically at 13.

According to this invention, the resultant of the thrust exerted by the set of springs 9 is merged into the axis $xx'$ of the epicyclic gear train. This result is due to the number of springs 9 differs in each notch, and/or to the use of springs of different forces, and/or to the use of springs having their points of application located at different distances from the axis $xx'$.

As shown in FIG. 4, the gear shift control lever 15 comprises a pivot pin 16 mounted in a bearing 17 rigid with a body or floor element 18. The end 19 of lever 15 carries a ball-and-socket joint 20 connected through a control rod 21 to the ball-and-socket joint 22 of an upper link 23.

The three horizontal axes passing through the center of rotation A of the power unit, the center Z of ball-and-socket joint 22 and the center $t$ of ball-and-socket 20, lie in a common plane respectively.

Similarly, the three vertical axes passing through the center of rotation A of the power unit, the center Z of ball-and-socket 22 and the center $t$ of ball-and-socket 20, lie in a common vertical plane, preferably coincident with the longitudinal center plane of the vehicle, so as to facilitate the mounting of the control lever on the floor of the vehicle.

Under these conditions, it is clear that the center of rotation A, the center of rotation Z of ball-and-socket 22 and the center of ball-and-socket 20 are aligned on a straight line $yy'$.

Since, in addition, the distance AZ is shorter than Zt, it will be seen that the power unit oscillations generated during variations in the engine torque have little if no influence on the gear shift control lever 15. It will be noted that the vibration amplitudes may be filtered or damped out by a rubber ring (not shown) secured to one of the ball-and-socket joints 20, 22.

Thus, the lever 15 may be held stationary in one of the positions corresponding to the desired operative or inoperative conditions of the vehicle (parking, reverse, neutral, automatic, low and high gears, as required) without causing any disturbance in the internal control positions of the change-speed transmission mechanism proper.

The upper link 23 is rigid with the vertical shaft 24 journaled in the bore 25 formed in the partition 26 of casing 1 which lies between the planet gear train 13 and the output bearing of differential 2. The shaft 24 is rigid with a bell-crank lever 27 (FIG. 6).

The bell-crank lever 27 has two pivot pins 28, 28' having journaled on the former 28 one end of a link 29 having its opposite end pivoted to the stem 30 of a slide valve (not shown), and on the latter 28' the push rod 31 adapted to actuate a parking latch 32, respectively.

A hydro-electric control unit 33 is housed in the oil sump 34 of the transmission mechanism, which is substantially aligned with the longitudinal center line of the vehicle.

With this arrangement it is possible to provide a manual control linkage disposed along the axis of the vehicle.

In the case of a power and transmission unit responsive to accelerations and brake applications it is possible, without departing from the basic principles of this invention, to provide a simple linkage for eliminating the detrimental transmission of the corresponding oscillations from the power unit to the manual control lever 15.

According to another feature characterizing this control mechanism, a fluid tight cover $12_1$ provided with positioning and centering means 35 (FIG. 7) constitutes the bearing of input shaft 5 and is adapted to distribute the fluid under pressure to one or more gearbox clutches. This cover $12_1$ separates the casing 1 of the change-speed transmission mechanism from the casing 36 of torque converter C and has a common joint plane or surface 12 with the casing 1 which is coplanar with the common joint or bearing surface of the converter casing 36 and the engine or power unit, as clearly shown in FIG. 7.

Although the above description and attached drawings refer to a single form of embodiment of the invention, it will readily occur to those skilled in the art that various modifications and variations may be brought in the practical embodiment thereof, and that other forms of embodiment may be contemplated, without inasmuch departing from the scope of the invention as set forth in the appended claims.

What is claimed as new is:

1. Change-speed mechanism for an epicyclic gear box which comprises a torque converter casing, a differential casing, a notched and bored gear box casing, a manual control linkage and shaft, a control lever, a pivot pin and socket joint on that lever, a control rod connecting that socket joint with a second socket joint, an upper link coincident with said second socket joint, a vertical control shaft rigid with said upper link, a vertical bore in that gear box casing and containing said vertical control shaft, piston actuated brakes, radial extensioned pressure members, resilient members acting on said brakes and enclosed in said gear box casing, a transmission control unit disposed in the lower portion of said gear box casing and responsive to said manual control linkage and shaft, wherein said radial extensions are distributed at unequal relative spacings and received in said notches of said gear box casing, the resultant force of said resilient members being coincident with the longitudinal axis of said gear box and perpendicular to a plane which is parallel to the pressure members and coincident with said control shaft.

2. Epicyclic change-speed transmission mechanism control system as set forth in claim 1, wherein said control shaft of the transmission control unit is disposed in close vicinity of the center of rotation of the power unit.

3. Epicyclic change-speed transmission mechanism control system as set forth in claim 1, wherein the centers of rotation of the power unit and of the pivot pin of the ball-and-socket joints provided on top of the change-speed mechanism casing and at the lower end of the manual gear shift control lever of said manual control linkage are aligned with one another.

4. Epicyclic change-speed transmission mechanism control system as set forth in claim 1, wherein the distance between the center of rotation of the power unit and the center of rotation of the pivot pin of the ball-and-socket joint provided on top of the change-speed mechanism casing and rigid with the control rod connecting same to the lower end of said manual gearshift control lever is short in proportion to the length of said rod.

5. Epicyclic change-speed transmission mechanism control system as set forth in claim 1, wherein the vertical shaft controlling directly said transmission control unit extends through the change-speed mechanism casing, between the epicyclic gear train and a differential output bearing, and emerges from the top of said change-speed mechanism casing, above the oil level therein.

6. Epicyclic change-speed transmission mechanism control system as set forth in claim 5, wherein said transmission control unit disposed under the epicyclic gear train and the output shaft of the change-speed mechanism is enclosed in an oil sump disposed along the longitudinal center line of the vehicle.

7. Epicyclic change-speed transmission mechanism control system as set forth in claim 6, wherein the change-speed transmission mechanism casing has the general configuration of a well, closed by a fluid-tight cover provided with centering and positioning means and a joint surface common with that of change-speed transmission mechanism casing, said surface being coplanar with the joint surface provided between the torque converter casing and the power unit.

* * * * *